(12) United States Patent
Troxler et al.

(10) Patent No.: US 7,523,745 B2
(45) Date of Patent: Apr. 28, 2009

(54) FUEL DELIVERY MODULE

(75) Inventors: John E. Troxler, Logansport, IN (US); Brian Jones, Delphi, IN (US)

(73) Assignee: Federal Mogul Worldwide, Inc., Southfield, MI (US)

( * ) Notice: Subject to any disclaimer, the term of this patent is extended or adjusted under 35 U.S.C. 154(b) by 216 days.

(21) Appl. No.: 11/548,400

(22) Filed: Oct. 11, 2006

(65) Prior Publication Data

US 2007/0125344 A1 Jun. 7, 2007

Related U.S. Application Data

(60) Provisional application No. 60/727,150, filed on Oct. 14, 2005.

(51) Int. Cl.
*F02M 37/04* (2006.01)
*G01F 23/30* (2006.01)
*G01F 23/32* (2006.01)

(52) U.S. Cl. .............................. 123/509; 73/306; 73/317

(58) Field of Classification Search .................. 73/307, 73/313, 317; 123/308, 509; 248/287.1, 295.11, 248/221.11, 222.12, 297.51, 407, 223.41, 248/225.11, 73, 224.61, 423, 420, 220.22, 248/297.21

See application file for complete search history.

(56) References Cited

U.S. PATENT DOCUMENTS

| | | | |
|---|---|---|---|
| 2,508,290 A | | 5/1950 | Poetsch |
| 2,718,784 A | | 9/1955 | Brake |
| 3,630,476 A | * | 12/1971 | Lococo ........................ 248/476 |
| 3,865,338 A | * | 2/1975 | Campbell .............. 248/297.21 |
| 4,033,539 A | * | 7/1977 | Bardocz ................... 248/228.6 |
| 4,651,701 A | | 3/1987 | Weaver |
| 4,671,121 A | | 6/1987 | Schieler |
| 4,790,185 A | | 12/1988 | Fedelem et al. |
| 4,907,773 A | * | 3/1990 | Menchetti et al. ......... 248/287.1 |
| 4,928,526 A | | 5/1990 | Weaver |
| 5,152,170 A | * | 10/1992 | Liu ............................. 73/317 |
| 5,196,824 A | | 3/1993 | Helm |
| 5,211,547 A | | 5/1993 | Gaston et al. |
| 5,218,942 A | | 6/1993 | Coha et al. |

(Continued)

Primary Examiner—Stephen K Cronin
Assistant Examiner—Sizo B Vilakazi
(74) Attorney, Agent, or Firm—Robert L. Stearns; Dickinson Wright PLLC (57) ABSTRACT

A fuel tank assembly (12) is provided for containing liquid fuel and supplying that fuel, upon demand, to an internal combustion engine. The assembly (12) includes a tank (14) in which is disposed a fuel pump module (18). The fuel pump module (18) includes a cup-like reservoir (34) which houses a fuel pump (46) and carries along its outer side wall (36) a fuel level sender unit (32). A float arm (60) extends pivotally from the fuel level sender (32) and swings up and down as the level of fuel in the tank (14) changes. The float arm (60) is pivotally supported on a carrier (58) attached to the side wall (36) of the reservoir (34). A sliding interface (62) is disposed along the side wall (36) of the reservoir (34) for slidably receiving and securing the carrier (58) along a captured alignment path. The fuel level sender (32) can be infinitely positioned in the longitudinal direction along the sliding interface (62) during assembly of the fuel pump module (18). The sliding interface (62) provides a more robust, more adaptable technique for positioning and fastening the fuel level sender (32) upon the reservoir (34).

15 Claims, 5 Drawing Sheets

U.S. PATENT DOCUMENTS

| | | |
|---|---|---|
| 5,375,467 A | 12/1994 | Banse |
| 5,398,659 A | 3/1995 | Zimmerman et al. |
| 5,431,047 A | 7/1995 | Coha et al. |
| 5,680,847 A | 10/1997 | Begley et al. |
| 5,765,435 A | 6/1998 | Grotschel et al. |
| 5,913,239 A | 6/1999 | Morris et al. |
| 6,138,524 A | 10/2000 | Tsuda et al. |
| 6,213,100 B1 | 4/2001 | Johansen |
| 6,298,540 B1 | 10/2001 | Benjey et al. |
| 6,595,239 B1 * | 7/2003 | Korst et al. ............ 137/558 |
| 6,837,222 B2 | 1/2005 | Okazono et al. |
| 6,941,808 B2 * | 9/2005 | Gouzou et al. ............ 73/313 |
| 2003/0116141 A1 | 6/2003 | Miller |

* cited by examiner

FUEL DELIVERY MODULE

CROSS REFERENCE TO RELATED APPLICATIONS

The present application claims priority to U.S. provisional application entitled Fuel Level Sensor Assembly Attachment for Fuel Delivery Module having Ser. No. 60/727,150 and filed on Oct. 14, 2005.

BACKGROUND OF THE INVENTION

1. Field of the Invention

This invention relates generally to fuel delivery systems for an internal combustion engine and, more particularly, toward a fuel delivery module immersed in a tank containing liquid fuel having a fuel level sender unit affixed thereto.

2. Related Art

Typical automotive fuel systems include in-tank mounted fuel delivery modules which contain a cup-like reservoir for containing a limited quantity of fuel within the tank. A fuel pump inside the reservoir withdraws the fuel from the reservoir and delivers it to an internal combustion engine. Fuel in the reservoir is continually replenished by the surrounding quantity of fuel in the fuel tank. However, as the level of fuel in the tank falls, the limited quantity of fuel in the reservoir provides a buffer of fuel around the fuel pump. When the vehicle makes hard turns or navigates steep inclines during low fuel conditions, the reservoir helps assure an adequate quantity of fuel is available to the pump.

Typically, a fuel delivery module will also contain a vapor vent valve and/or recirculation system, together with a fuel level sensing float and accompanying electronics. The reservoir functions, therefore, as a container around the fuel pump for collecting the reserve supply of fuel for the pump to use during conditions when it might otherwise be temporarily lacking fuel, as well as a support housing for the level sensing electronics and hardware.

The fuel delivery module has the capability of detecting and measuring the level of fuel in the fuel tank by way of its fuel level sender unit. The fuel level sender unit is typically attached to the reservoir and includes a float mechanism. The float mechanism is pivotally mounted to the fuel level sender assembly, which interacts with circuitry to develop a measure of the level of fuel in the tank based on the buoyant position of the float.

The method by which the fuel level sender unit is attached to the reservoir has been a source of much attention over the years. For reservoir housings made of injection molded plastic, it has been common to mold in place fittings of the self-locking variety to "snap-fit" the fuel level sender carrier in position. The carrier comprises a card-like mounting structure upon which the float mechanism is pivotally supported. The problem with the snap-fit technique, however, is that it is generally limited to applications which use plastic injection molded reservoirs. Injection molding is a fairly expensive form of manufacturing due to the high cost of tooling and its relatively slow through-put rates. A further disadvantage is the single, fixed orientation of the fuel level sender carrier relative to the reservoir. That is, the carrier cannot be moved or relocated relative to the reservoir once snapped in position. This, in turn, could affect the measurement qualities of the fuel delivery module depending upon the specific fuel tank in which it is installed and any running model changes which might be introduced to the fuel tank or to the module mounting arrangement.

Some fuel delivery module applications call for the reservoir to be made from aluminum or other metal-based material. In order to attach the fuel level sender unit to a non-plastic housing, such as aluminum, for example, the possible choices are limited in view of certain practical considerations like fabrication cost and the properties of the reservoir material. Some prior art applications have taught a method of resistance welding a metallic frame to an aluminum reservoir. The frame would thus comprise the carrier for the fuel level sender. While this technique allows some degree of variability in positioning the carrier on the module reservoir, it has proven problematic in practice because welding to aluminum is highly process sensitive due to aluminum's conductivity and oxidation potential. In addition, the inherent process variation characteristic of welding can be a concern.

Accordingly, there is a need for an improved method of attaching a fuel level sender unit to the reservoir of a fuel delivery module which allows variable positioning of the sender unit relative to the module reservoir and which can be accomplished on any type of housing composition, be it aluminum, plastic, or other material.

SUMMARY OF THE INVENTION

The invention comprises a fuel delivery module of the type immersed in a tank containing liquid fuel for supplying fuel from the tank to an internal combustion engine while monitoring the quantity of fuel in the tank. The module comprises a reservoir defining a theoretical longitudinal axis. The reservoir has a peripheral side wall for segregating a limited quantity of fuel within the tank. A fuel pump is disposed in the reservoir for forcibly moving the segregated fuel from the reservoir to the internal combustion engine. A fuel level sender is provided for measuring the quantity of fuel in the tank. The fuel level sender includes a carrier and a float arm pivotally extending from the carrier. A longitudinally extending sliding interface is disposed on the side wall of the reservoir for slidably receiving and securing the carrier along a captured alignment path. The fuel level sender can be infinitely positioned in the longitudinal direction along the sliding interface during assembly and then permanently fixed in a desired operational position for subsequent service use.

The invention overcomes the shortcomings and disadvantages found in prior art systems by way of the sliding interface which is formed on the side wall of the reservoir. The carrier of the fuel level sender is captured in and slides along the sliding interface until a desired operational position has been achieved. Then, appropriate securing techniques, which may include staking and/or welding, permanently fix the carrier in the desired operational position for subsequent service use.

The invention also contemplates a fuel tank assembly for containing liquid fuel and supplying fuel upon demand to an internal combustion engine. The assembly comprises a tank for containing liquid fuel. A reservoir is immersed in the tank and defines a theoretical longitudinal axis. The reservoir has a peripheral side wall for segregating a limited quantity of fuel within the tank. A fuel pump is disposed in the reservoir for forcibly moving the segregated fuel from the reservoir to an internal combustion engine. A fuel level sender measures the quantity of fuel in the tank. The fuel level sender includes a carrier and a float arm pivotally extending from the carrier. The improvement is characterized by a longitudinally extending sliding interface disposed on the side wall of the reservoir for slidably receiving and securing the carrier along a captured alignment path. The fuel level sender can be infinitely positioned in the longitudinal direction along the sliding interface during assembly and then permanently fixed in the desired operational position for subsequent service use.

Furthermore, the invention contemplates a method of assembling a fuel delivery module of the type immersed in a tank containing liquid fuel for supplying fuel from the tank to an internal combustion engine while monitoring the quantity of fuel in the tank. The method comprises the steps of providing a reservoir defining a theoretical longitudinal axis and having a peripheral side wall for segregating a limited quantity of fuel within the tank. The method further comprises inserting a fuel pump in the reservoir and attaching a fuel level sender to the reservoir, the fuel level sender provided for measuring the quantity of fuel in the tank. The method is characterized by the attaching step including slidably receiving and securing the fuel level sender along a captured sliding interface along the side wall of the reservoir. The fuel level sender can be infinitely positioned in the longitudinal direction along the sliding interface during assembly and then permanently fixed in a desired operational position for subsequent service use.

Therefore, the subject invention addresses the long-felt yet unsolved needs associated with attaching a fuel level sender to the reservoir of a fuel delivery module. Whether the reservoir is made from a metallic or plastic composition, the fuel level sender can be infinitely positioned relative to the reservoir and then fixed in place using techniques which are effective, cost efficient, and versatile.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to the Figures, wherein like numerals indicate like or corresponding parts throughout the several views, a fuel tank assembly according to the subject invention is generally shown at 12. The tank assembly 12 is of the type commonly used for containing liquid fuel, such as gasoline, and then supplying that fuel upon demand to an internal combustion engine (not shown). The assembly 12 includes a tank 14 comprising a thin-walled, hollow member into which liquid fuel is filled through a nozzle 16. A fuel pump module, generally shown at 18, is disposed within the tank 14. The module 18 is of the type intended to be immersed fully within the liquid fuel in the tank 14 and, upon demand, supplying that fuel under pressure to the internal combustion engine. The fuel pump module 18 also simultaneously monitors the quantity of fuel in the tank 14.

The module 18 includes a hanger flange 20 which seats in a complementary-shaped opening in the top of the tank 14. The hanger flange 20 acts as a lid, connecting the fuel pump module 18 to the tank 14 and also routing fluids into and out of the tank 14, such as fuel and vent gases. A fuel outlet tube 22 is carried on the hanger flange 20, together with the fuel return tube 24 and a vent tube 26. An electrical connector 28 serves as a coupling on the hanger flange 20 for supplying electric power through electrical leads 30 to a fuel pump, as well as to a fuel level sender, generally indicated at 32. As will be described in greater detail subsequently, the fuel level sender 32 is used as a fuel detecting means for measuring the quantity of residual fuel in the tank 14.

The module 18 includes a reservoir generally indicated at 34 defining a theoretical longitudinal axis A. In operation, the longitudinal axis A may be oriented vertically, while some applications may dictate a tilted orientation. Although depicted as generally tubular in the drawings, this is but one configuration, as the reservoir 34 can alternatively be of nearly any geometric shape. The reservoir 34 has a peripheral side wall 36 for segregating a limited quantity of fuel within the tank. In the embodiment depicted, the side wall 36 is open at its top end 38, yet enclosed at its bottom end by a base 40. Fuel surrounding the reservoir 34 within the tank 14 flows readily into the reservoir 34 through its open top end 38. Once the level of fuel in the tank 14 has fallen below the elevation of the top end 38, fuel is permitted to enter the reservoir 34 through a low side or bottom opening 42. The low side opening 42 can be fitted with a one-way valve 44 shown illustratively in FIG. 1 as a flapper valve. The one-way valve 44 prevents fuel segregated inside the reservoir 34 from flowing out when the surrounding level of fuel in the tank 14 is below the top end 38. However, whenever the pressure differential between the fuel inside the reservoir 34 is exceeded by the fuel surrounding the reservoir 34, the one-way valve 44 automatically opens to allow liquid fuel from the surrounding tank 14 to flow into the reservoir 34. In an alternative configuration not depicted, the one-way valve 44 and/or opening 42 can be disposed in the side wall 36 instead of in the base 40.

Figure 3:
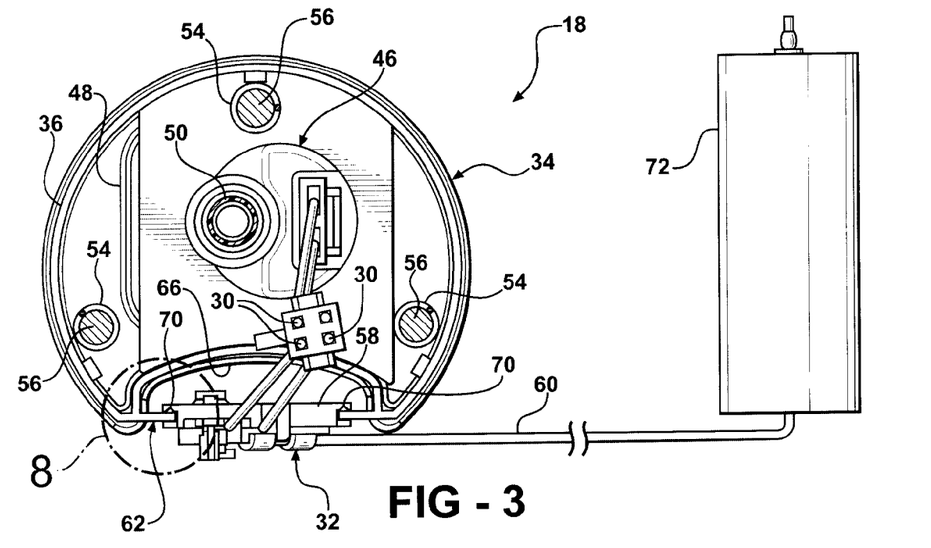
FIG. 3 is a view taken generally along lines 3-3 of FIG. 1.
Figure 4:
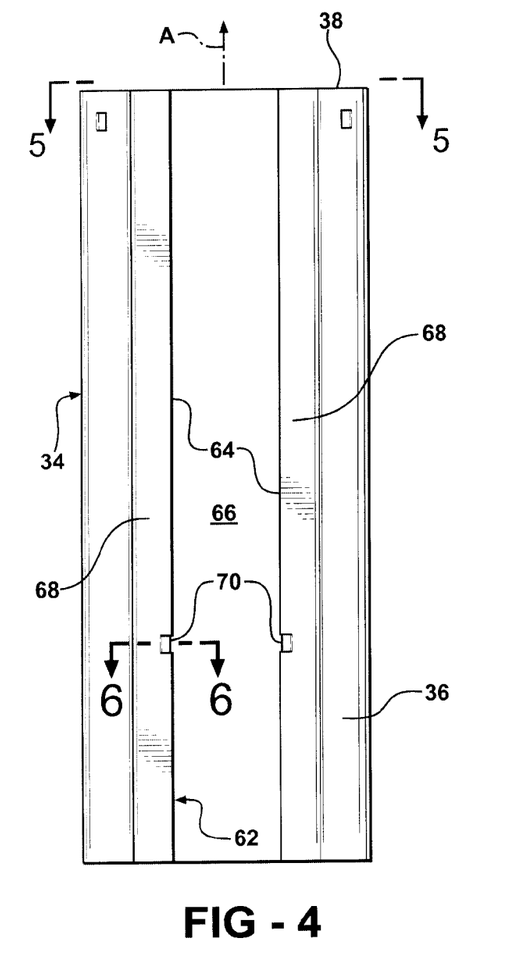
FIG. 4 is a front elevation view of a reservoir according to one embodiment of the subject invention.
Figure 5:
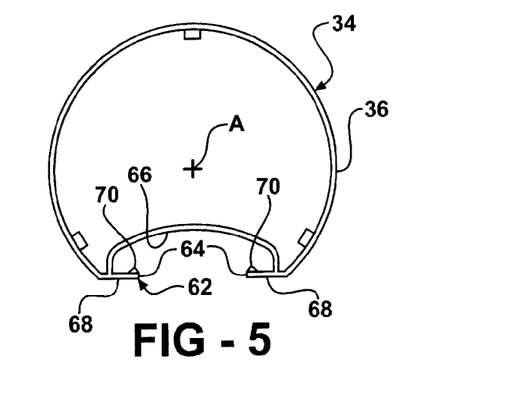
FIG. 5 is a top view of the reservoir taken generally along lines 5-5 of FIG. 4.
Figure 6:
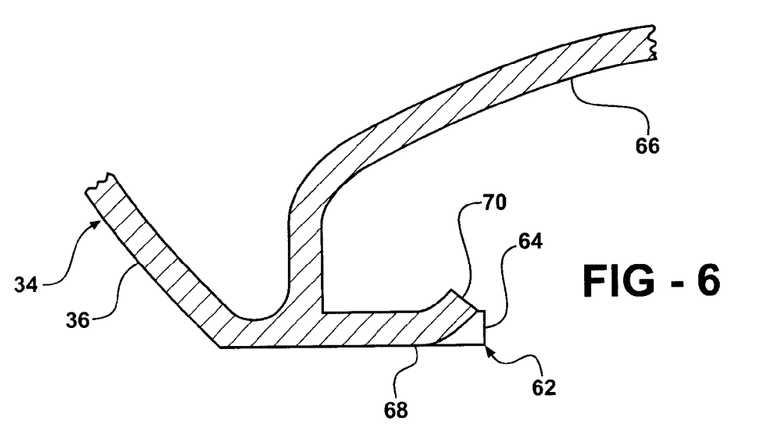
FIG. 6 is an enlarged fragmentary cross-section taken generally along lines 6-6 of FIG. 4 and depicting a portion of the sliding interface along the side wall of the reservoir.
Figure 7:
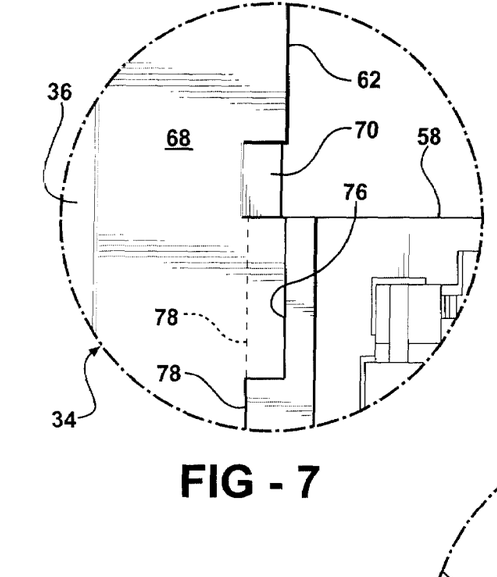
FIG. 7 is an enlarged view of the area circumscribed at 7 in FIG. 1.
Figure 8:
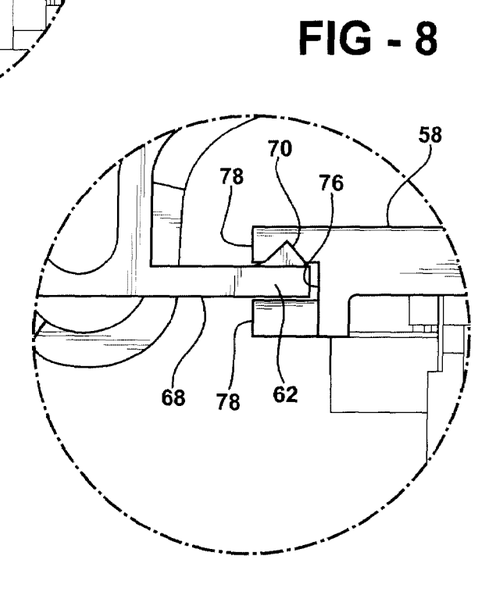
FIG. 8 is an enlarged view of the area circumscribed at 8 in FIG. 3.

A fuel pump, generally indicated at 46 in FIG. 3, is disposed in the reservoir 34. The fuel pump 46 is provided for forcibly moving the fuel segregated inside the reservoir 34 to the internal combustion engine. Any such fuel pump suitable for the purpose may be used in the application. The fuel pump 46 is an electrically driven, motorized device receiving electrical power via the electrical connector 28. The suction side of the fuel pump 46 draws fuel into the pump 46 through a suction filter 48. Although depicted inside the reservoir 34 in FIG. 3, the suction filter 48 can alternatively be disposed on the outside of the reservoir 34, opposite the opening 42. The high pressure or outlet side of the pump 46 connects with the fuel outlet tube 22 via a flexible hose 50.

The base 40 of the reservoir 34 is fitted with a plurality of feet 52 for engaging the bottom of the tank 14. Compression springs 54 operatively extend between the hanger flange 20 and the reservoir 34 for securely locating the fuel pump module 18 in its operative position within the tank 14. Guide rods 56 extend through the compression springs 54 to prevent buckling and provide rigid connections between the hanger flange 20 and reservoir 34. The guide rods 56 slide telescopically within corresponding receiving mounts (not shown) in the reservoir 34. Accordingly, the compression springs 54 tightly press the feet 52 against the floor of the tank 14 and, together with the fixation at the hanger flange 20, hold the fuel pump module 18 securely in position inside the tank 14.

Figure 2:
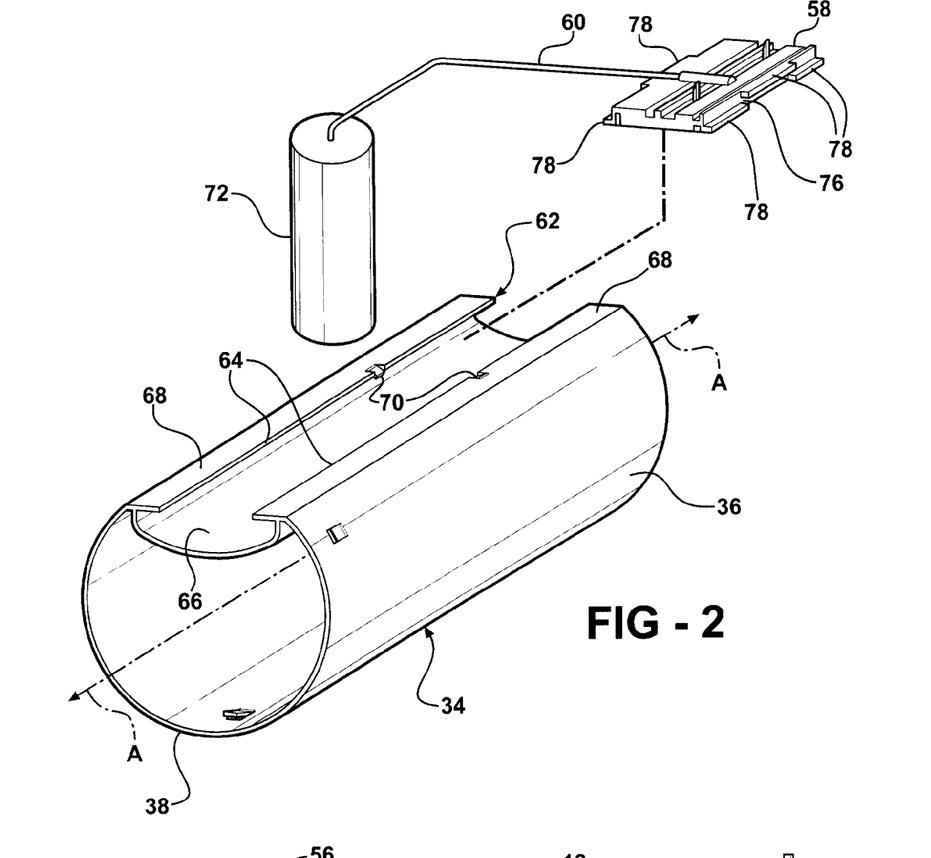
FIG. 2 is an exploded perspective view of a reservoir according to the subject invention, together with a fuel level sender subassembly detached therefrom.

As introduced to previously, a fuel level sender 32 is provided for measuring the quantity of fuel in the tank 14. Referring now to FIG. 2, the fuel level sender 32 is shown including a carrier 58 and a float arm 60 pivotally extending from the carrier 58. A longitudinally extending sliding interface 62 is disposed along the exterior of the side wall 36 of the reservoir 34 for slidably receiving and securing the carrier 58 along a captured alignment path. In other words, the sliding interface 62 establishes a controlled path along which the carrier 58 can be moved throughout a range of longitudinal positions relative to the side wall 36. The fuel level sender 32 can be infinitely positioned in the longitudinal direction along the sliding interface 62 during assembly and then permanently fixed in a desired operational position for subsequent service use.

As depicted in the figures, the reservoir 34 is preferably extruded from a plastic or aluminum material in a generally cylindrical, tubular shape between its top end 38 and base 40. The circular cross-section of the reservoir 34 is interrupted by a pair of opposing flanges 64 separated by a trough indentation 66. The flanges 64 in this embodiment are spaced from one another and extend parallel to the longitudinal axis A. Each flange 64 has an outer face 68 which is co-planer with the outer face 68 of the opposing flange 64.

The sliding interface 62 as depicted in the figures represents but a single preferred embodiment of the invention. Those of skill will appreciate that other mechanical variations of the general concept may be implemented with equal effect. For example, if the reservoir 34 is manufactured from a technique other than extrusion, such as injection molding, the sliding interface 62 may extend only partially along the length of the reservoir. Just as the side wall 36 of the reservoir 34 can be varied in its geometric shape to suit any particular application or manufacturing condition, the sliding interface 62 can likewise be reconfigured considerably from that depicted in the drawings without departing from the spirit of this invention.

As perhaps best shown in FIG. 2, a pair of aligned upsets 70 are introduced into the flanges 64 so that a small section thereof is deformed inwardly toward the trough 66. If the side wall 36 is fabricated from an extruded aluminum or other malleable material, the upsets 70 are preferably formed in a crimping or punching operation. However, if the side wall 36 is made from plastic or other thermally sensitive material, the upsets 70 can be created by heat staking. Of course, other techniques for introducing the upsets 70 into the flanges 64 are possible.

Figure 1:
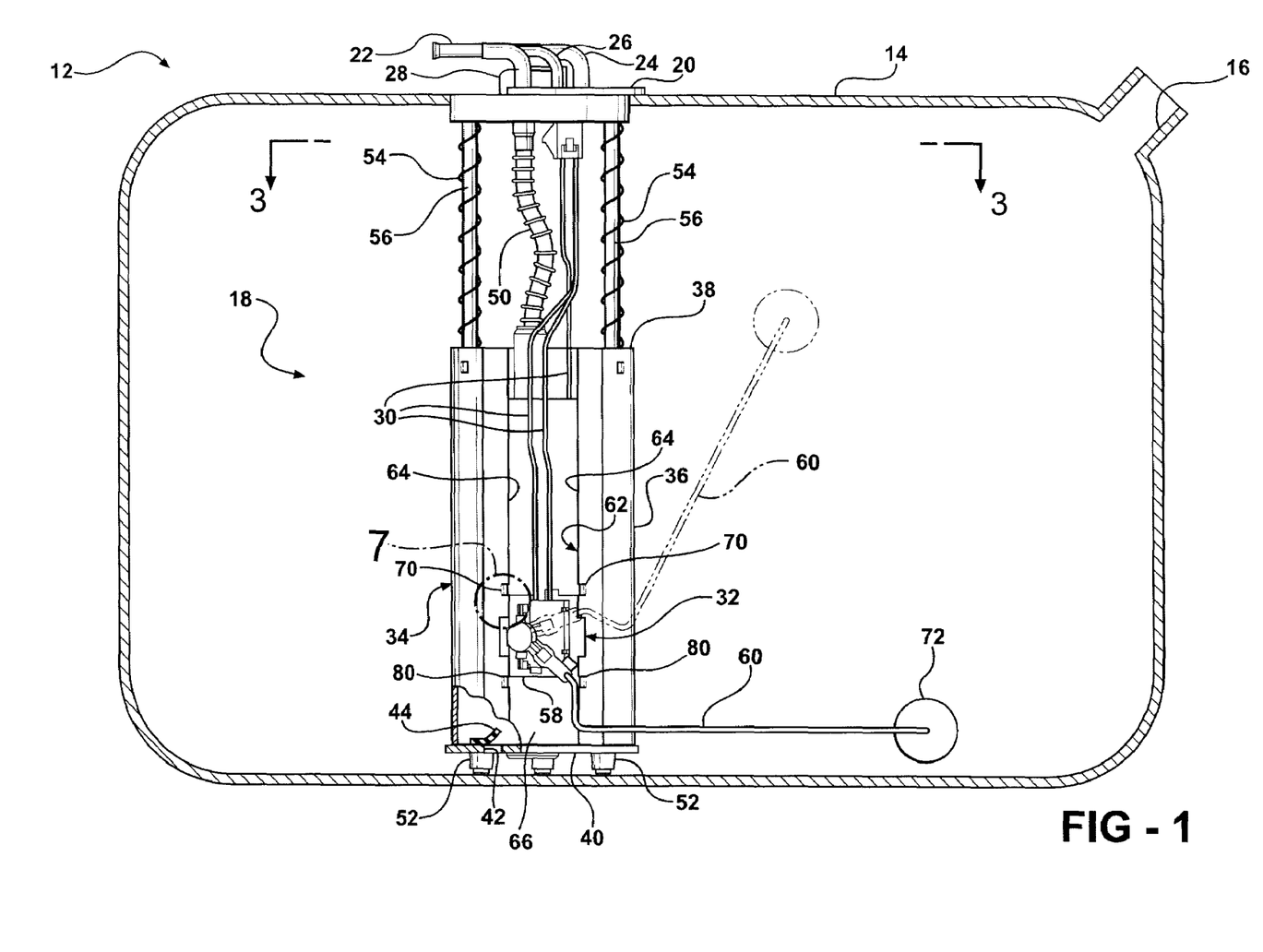
FIG. 1 is a simplified depiction of a fuel tank assembly in cross-section with a fuel delivery module according to the subject invention affixed therein.

Referring again to the fuel level sender 32 as depicted in FIGS. 1 and 3, the carrier 58 is adapted to fit in the sliding interface 62 by interacting with the flanges 64. The trough 66 establishes sliding clearance relative to the side wall 36. The float arm 60 pivotally extends from the carrier 58 and supports a buoyant float 72 on its distal end. Electronic circuitry built into the carrier 58 interacts with the float arm 60 to register relative pivotal movement caused by the instantaneous position of the float 72. The electronic circuitry is preferably integrated into the body of the carrier 58. In the preferred embodiment, although not necessarily, a pivot journal 74 for the float arm 60 is established in the carrier 58. This is perhaps best shown in FIGS. 9-11.

Figure 9:
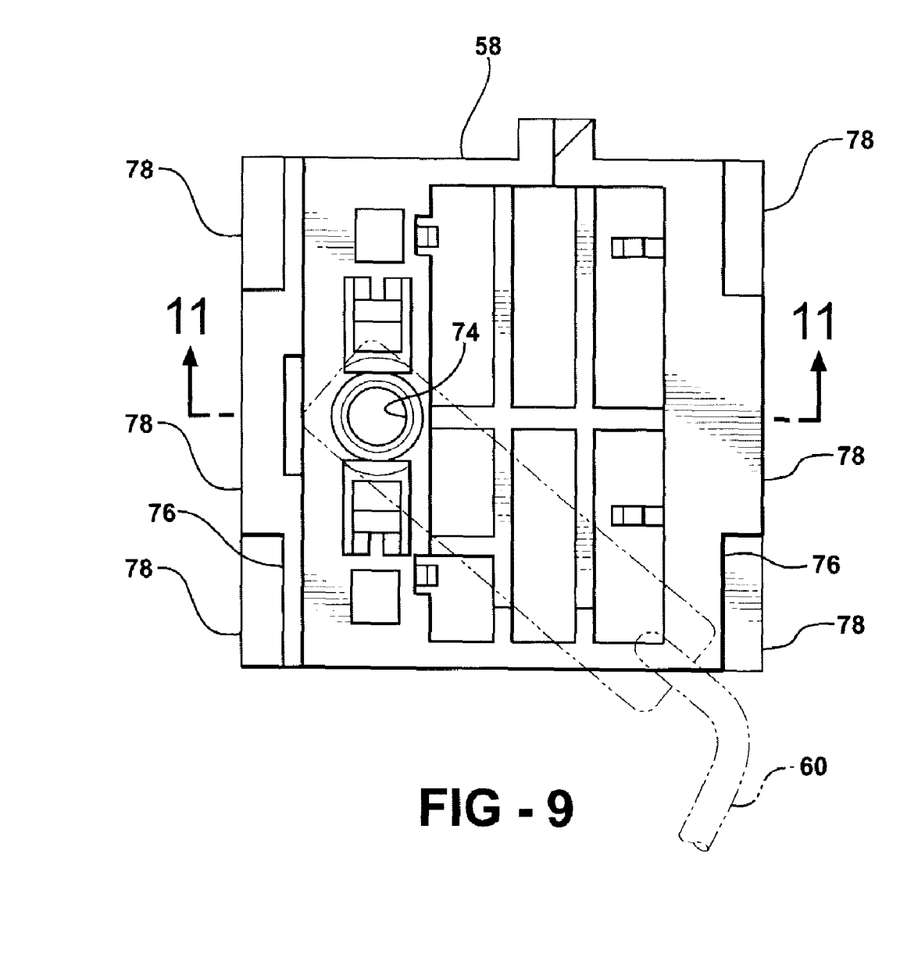
FIG. 9 is a front view of the carrier for the fuel level sender and showing a portion of the float arm in phantom.
Figure 10:
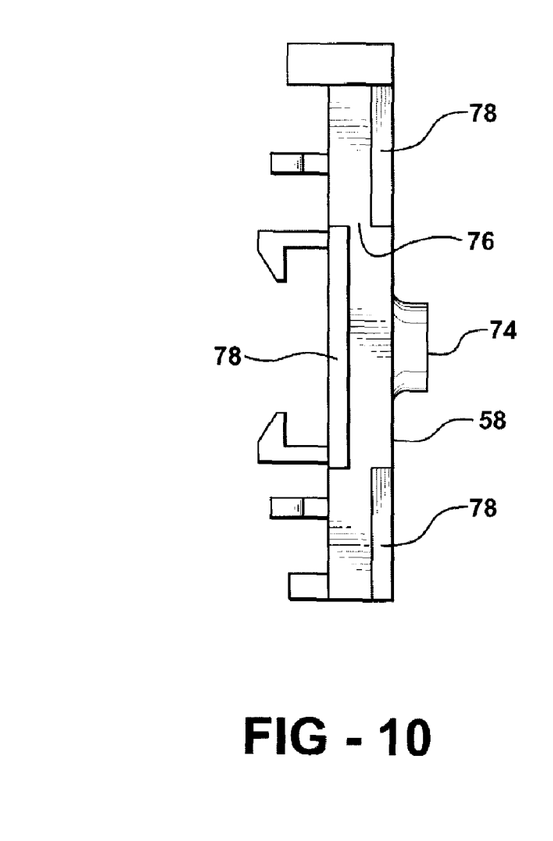
FIG. 10 is a left end view of the carrier shown in FIG. 9.
Figure 11:
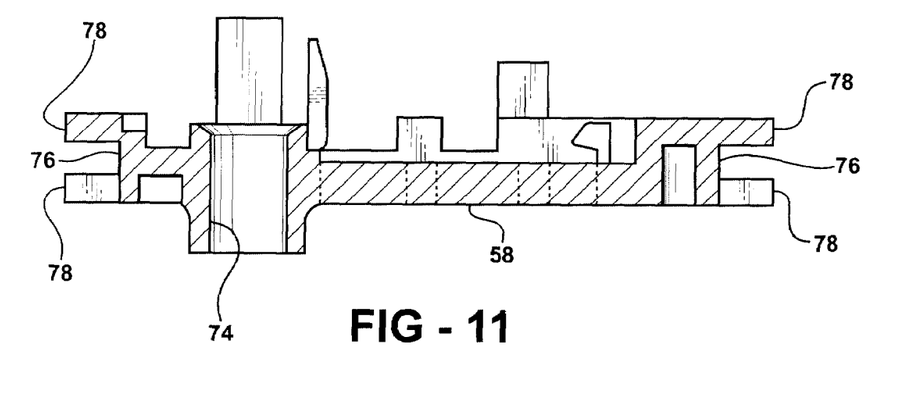
FIG. 11 is a cross-sectional view of the carrier as taken generally along lines 11-11 of FIG. 9.

The longitudinal edges of the carrier 58 form channels 76. The channels 76 can be created as continuous elements or, as depicted in FIGS. 9-11, may be established by alternating segmented tabs 78. The carrier 58 slidably mates with the interface 62 via its channels 76 received over the respective flanges 64. Thus, the forwardmost tabs 78 slide along the faces 68 of the flanges 64, whereas the rearwardmost tabs 78 engage behind the flanges 64, proximate the trough 66. The carrier 58 is thus freely slayable along the sliding interface 62 and is moved to a position against the upsets 70. Once the carrier 58 has reached its terminal position against the upsets 70, it is secured in place as having reached a predetermined, fixed operative position. To prevent the carrier 58 from retreating back down the sliding interface 62, additional upsets 80 are formed in the flanges 64, as best shown in FIG. 1. As an alternative to the upsets 70, 80 resulting from impact deformations introduced into the flanges 64, the upsets 70, 80 could be accomplished by welding or otherwise adhering the side edges of the carrier 58 to the flanges 64. In another foreseeable variation, the side edges of the carrier 58 could be formed with but a single longitudinally extending rib and the flanges 64 reformed into a channel configuration to receive the rib on either side of the carrier 58. Furthermore, it is not necessary that the sliding interface 62 be formed by two opposing longitudinally extending features. It is also possible that a single longitudinally extending feature such as a rib or channel could be substituted in place of the paired features described above.

Accordingly, the fuel level sender 32 can be moved to any one of numerous predetermined positions and then mechanically fastened in position via the sliding interface 62. By adjusting the location at which the initial upsets 70 are placed, the operative position of the fuel level sender 32 can be manipulated for optimal results. The problems and process sensitivities inherent in prior art techniques, such as welding, are overcome by attaching the fuel level sender 32 via the extended sliding interface 62 formed along the outside of the reservoir 34. Therefore, the subject invention provides a more robust, more adaptable fuel delivery module construction.

According to another aspect of the invention, a method of assembling a fuel delivery module 18 is provided. The method comprises the steps of providing a reservoir 34 defining a theoretical longitudinal axis A and having a peripheral side wall 36 for segregating a limited quantity of fuel within the tank 14. The method also includes inserting a fuel pump 46 into the reservoir 34. The method also includes attaching a fuel level sender 32 to the reservoir 34, where the fuel level sender 32 is provided for measuring the quantity of fuel in the tank 14. The method is highlighted by the attaching step including slidably receiving and securing the fuel level sender 32 along a captured sliding interface 62 disposed along the side wall 36 of the reservoir 34. By this method, the fuel level sender 32 can be infinitely positioned in the longitudinal direction along the sliding interface 62 during the assembly process and then permanently fixed in a desired operational position for subsequent service use.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A fuel delivery module of the type immersed in a tank containing liquid fuel for supplying fuel from the tank to an internal combustion engine while monitoring the quantity of fuel in the tank, said module comprising:

a reservoir defining a theoretical longitudinal axis, said reservoir having a peripheral side wall for segregating a limited quantity of fuel within the tank, a pair of opposing flanges disposed on the exterior of said side wall, said flanges spaced parallel from one another and extending parallel to said longitudinal axis;

a fuel pump disposed in said reservoir for forcibly moving the segregated fuel from said reservoir to an internal combustion engine;

a fuel level sender for measuring the quantity of fuel in the tank, said fuel level sender including a carrier, said carrier including longitudinally opposing side edges, each of said side edges including a channel formed therein;

a longitudinally extending sliding interface formed by said pair of opposing flanges and disposed on said side wall of said reservoir, said sliding interface having opposite ends for slidably receiving and securing said carrier along a captured alignment path defined between said ends whereby said fuel level sender can be infinitely positioned in the longitudinal direction along said sliding interface during assembly and then permanently fixed in a desired operational position for subsequent service use; and wherein at least one upset is formed in each of said flanges spaced from said ends of said sliding interface for limiting sliding movement of said carrier there along.

2. The module of claim 1 wherein said upset comprises an impact deformation in the as-formed contour of said flanges.

3. The module of claim 1 wherein said upset comprises a welded region between each of said flanges and said respective side edges of said carrier.

4. The module of claim 1, wherein said side wall comprises a body of extrusion.

5. The module of claim 4 wherein said housing is fabricated from a plastic material.

6. The module of claim 4 wherein said housing is fabricated from a metallic material.

7. The module of claim 4 wherein said side wall includes a longitudinally extending trough between said opposing flanges.

8. The module of claim 4 wherein said side wall has a generally circular transverse cross-section except between said flanges.

9. The module of claim 4 wherein each said flange has an outer face co-planar with the outer face of said opposing flange.

10. The module of claim 1 wherein said peripheral side wall of said reservoir is enclosed at a bottom end thereof by a base.

11. The module of claim 10 wherein said reservoir includes a one-way valve for preventing the segregated fuel from flowing out of said receptacle but allowing liquid fuel from the surrounding tank to flow into said reservoir.

12. The module of claim 11 wherein said one-way valve is disposed in said base.

13. A method of assembling a fuel delivery module of the type immersed in a tank containing liquid fuel for supplying fuel from the tank to an internal combustion engine while monitoring the quantity of fuel in the tank, said method comprising the steps of:

providing a reservoir defining a theoretical longitudinal axis and having a peripheral side wall for segregating a limited quantity of fuel within the tank;

inserting a fuel pump in the reservoir;

attaching a fuel level sender to the reservoir, the fuel level sender provided for measuring the quantity of fuel in the tank;

and said attaching step including slidably receiving and securing the fuel level sender along a captured sliding interface disposed along the side wall of the reservoir and having opposite ends whereby the fuel level sender can be infinitely positioned in the longitudinal direction along the sliding interface during said assembly and then permanently fixed in a desired operational position for subsequent service use; and wherein said attaching step further includes forming at least one upset in the sliding interface spaced from both ends of the sliding interface for limiting sliding movement of the fuel level sender there along.

14. The method of claim 13 wherein said step of forming an upset comprises impact deforming a contour in the sliding interface.

15. The method of claim 13 wherein said step of forming an upset comprises welding a region of the sliding interface.

* * * * *